INVENTORS
WARD E. BRIGHAM
ROBERT L. ECKERT

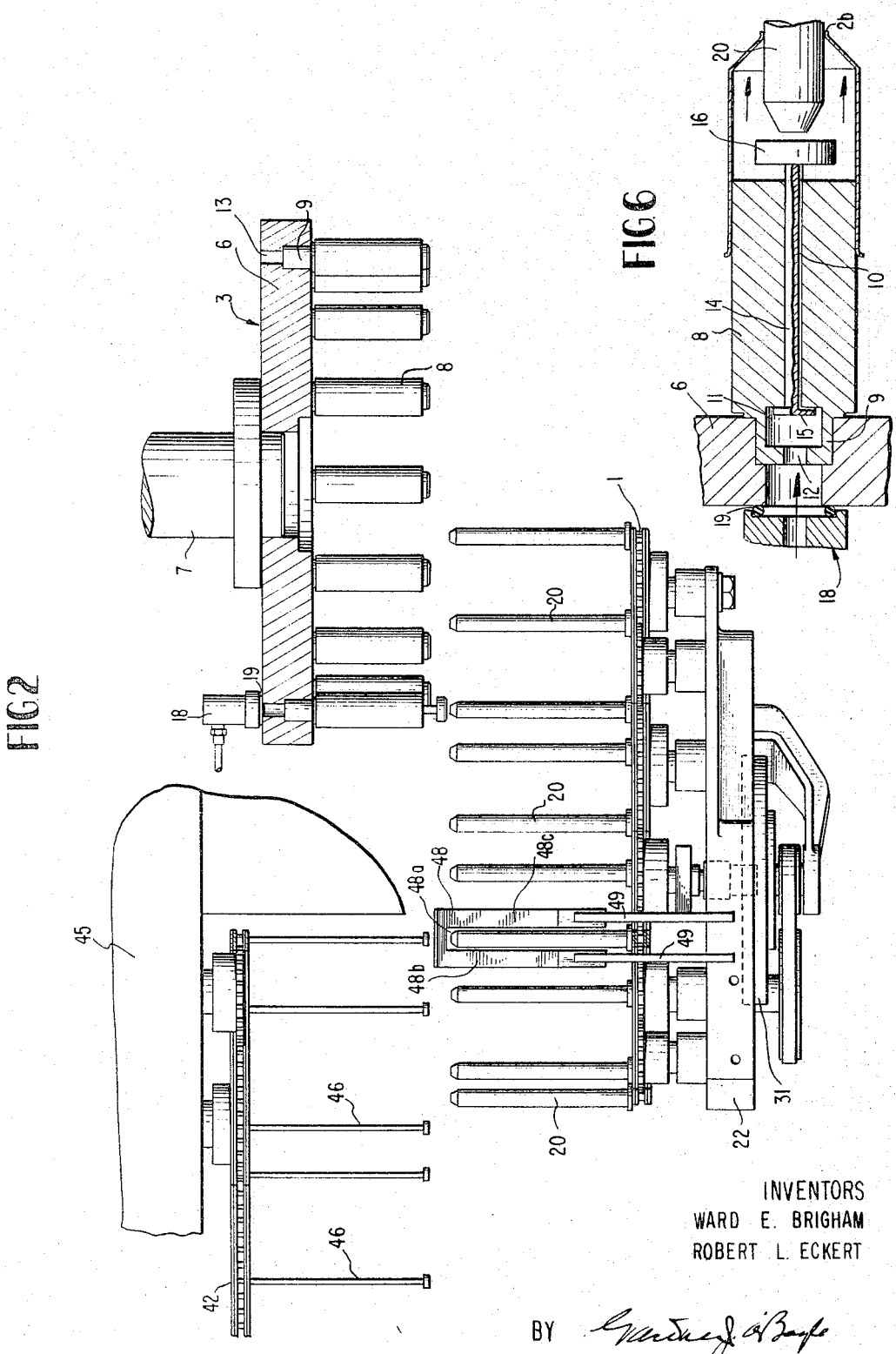

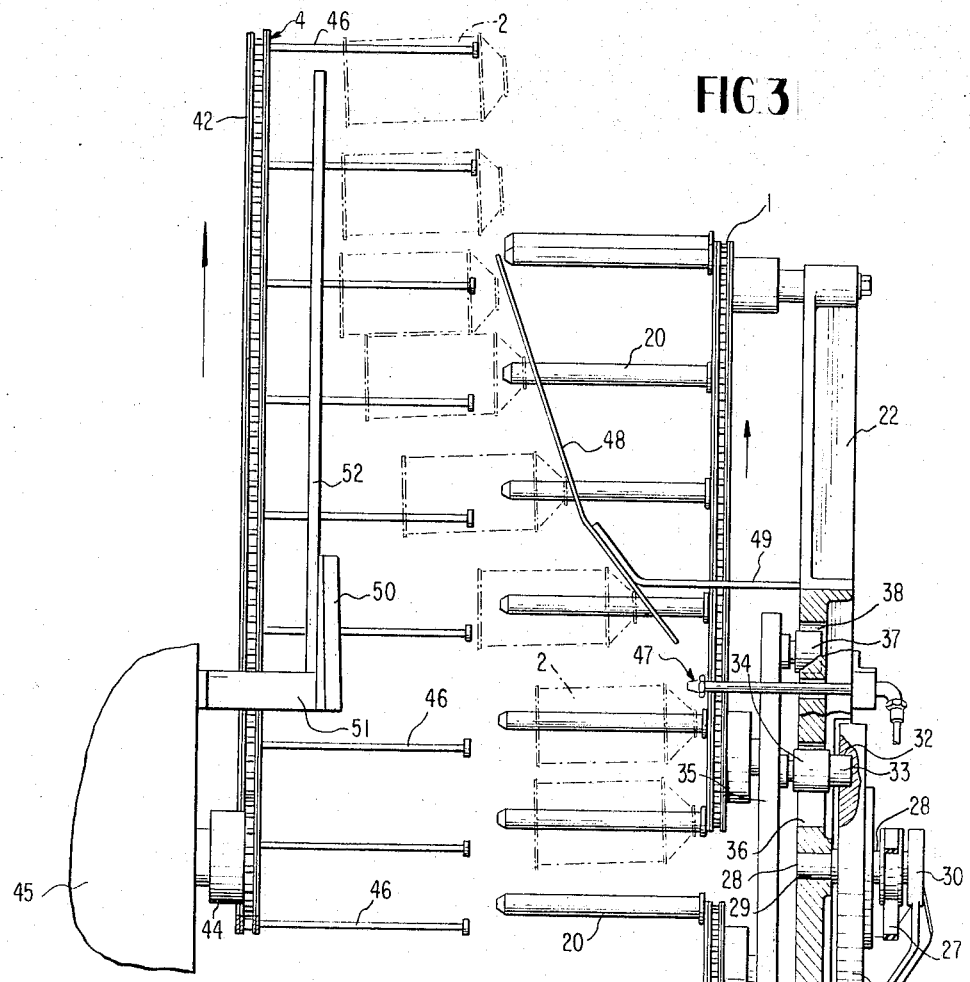
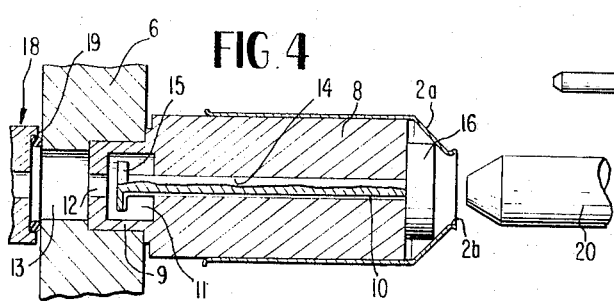
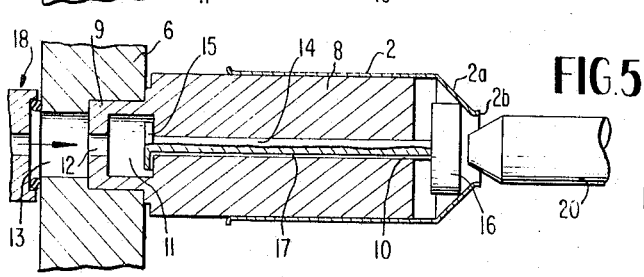

United States Patent Office 3,300,019  
Patented Jan. 24, 1967

3,300,019  
TRANSFER ASSEMBLY FOR USE WITH HIGH SPEED CAN DECORATING MACHINES  
Ward E. Brigham and Robert L. Eckert, Rutherford, N.J., assignors to Sun Chemical Corporation, New York, N.Y., a corporation of Delaware  
Filed Feb. 26, 1965, Ser. No. 435,645  
9 Claims. (Cl. 198—25)

The invention relates to a transfer assembly for use with can decorating machines, and more particularly, to a transfer assembly for use with high speed machines adapted for coating or printing aerosol cans.

Machines for decorating tubes, cans, and like containers comprising a cylindrical body portion are usually provided with conveying means for successively advancing the containers to a coating or a printing station, transfer means for removing the decorated containers from said conveying means and placing them on a second conveyor adapted to convey the containers through a drying oven. Some of the machines also incorporate means for rendering the coating device or the printing mechanism inoperative, in the event that a container is missing from or is not properly positioned on its support secured to the conveyor, as the support approaches the coating or printing station.

A container decorating machine of the general type referred to above is disclosed in our pending application for Machine for Decorating Collapsible Tubes, Serial No. 418,618, filed December 16, 1964, now U.S. Patent 3,250,213 dated May 10, 1966. The machine described in said pending application is designed for coating and printing collapsible tubes at relatively high speeds, and comprises essentially, means to sequentially transfer a tube from a source of supply to one of the spindles of an intermittently rotatable spindle turret, whereby the tubes are successively advanced to a coating or printing station, the decorated tube being removed from the spindle turret and transferred to a chain conveyor, for conveying the tubes through a drying oven. Removal of the decorated tube from the spindle turret and transfer to the chain conveyor is accomplished by means of a transfer disc assembly constructed and arranged so that when one decorated tube is being removed from the spindle turret another decorated tube is simultaneously transferred to the oven conveyor.

Another machine for coating, printing or otherwise decorating the exterior surface of a cylindrical container at relatively high speed is disclosed in pending application for High Speed Can Printing Press, Serial No. 395,113, filed September 4, 1964, now U.S. Patent 3,227,070 dated January 4, 1966, and assigned to the same assignee as the instant application. Basically, the machine of the above-noted application comprises a can handling and feeding assembly, and a can printing assembly. The cans which are to be printed are introduced into the machine by means of a pin carrying conveyor on which the cans are supported while being conveyed to a feed mechanism, from which mechanism they are transferred to a first feed wheel which receives the individual cans and delivers them to a second feed wheel at a point of transfer. The cans are then transferred to an intermittently rotatable spindle turret and advanced to the printing station, the printed can being subsequently removed from the spindle turret and transferred to a chain conveyor for conveying the cans through a drying oven.

The present invention relates to an improved transfer assembly for use with tube and can decorating machines of the type disclosed in the aforementioned patents, said transfer assembly including an improved spindle turret and associated can transfer and conveying means.

An object of the invention is to provide an improved machine for decorating cans and like containers at relatively high speeds.

Another object of the invention is to provide a machine for decorating cans and the like, having an improved transfer assembly for removing decorated cans from the conveying means employed to advance the cans to a coating device or a printing mechanism and place them on a conveying mechanism operatively associated with an oven conveyor, and adapted to transfer the cans thereto.

Yet another object of the invention is to provide an improved transfer mechanism for use with high speed can decorating machines of the character employing a spindle turret for advancing the cans to a coating or printing station, the transfer mechanism incorporating an endless chain adapted to receive decorated cans from the spindle turret, a conveyor for conveying the decorated cans through a drying oven, and means operatively connected to the transfer mechanism for transferring the cans from the chain to the oven conveyor.

Still another object of the invention is to provide an improved spindle turret for use with high speed can decorating machines wherein a transfer mechanism is positioned adjacent the spindle turret, and each of the spindles is provided with means for urging a can from a respective spindle onto the transfer mechanism.

With these and other objects in view, which may be incident to our improvements, the invention consists in the parts and combinations to be hereinafter set forth and claimed, with the understanding that the several necessary elements, comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions which, for the purpose of explanation, have been made the subject of illustration.

In the drawings:

FIGURE 2 is a top plan view of the transfer assembly, partially in section;

FIGURE 3 is an end elevational view, partially in section, of the transfer chain showing, in phantom, the removal of cans from the chain to the oven conveyor; and FIGURES 4, 5 and 6 show detailed views, partially in section, showing the mechanism for removing cans from the spindle turret and transferring them to a respective pin on the transfer chain.

Figure 1:
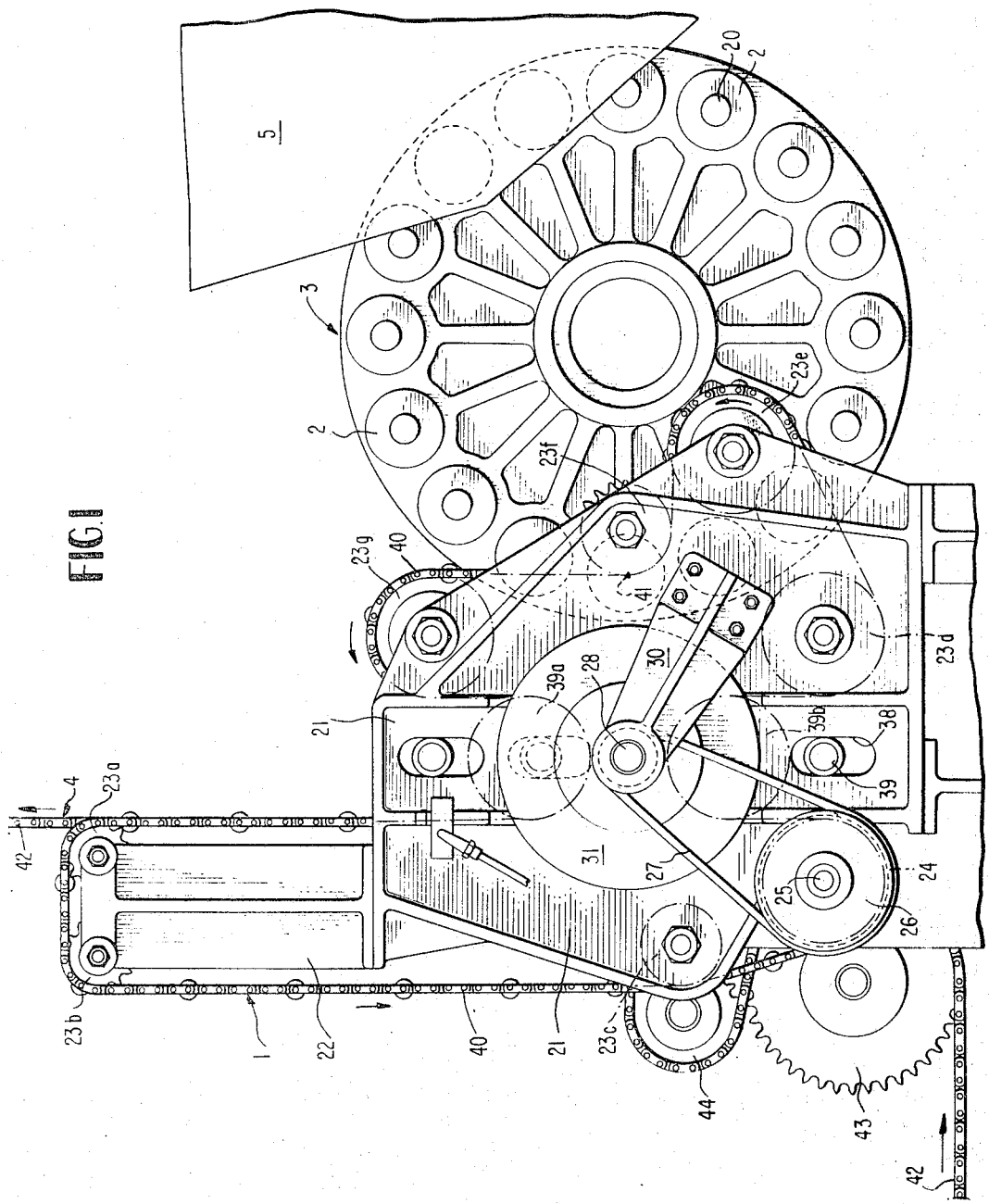
FIGURE 1 is a side elevational view of the transfer assembly of the present invention.

Referring to the drawings, and more particularly to FIGURES 1, 2 and 3, the transfer assembly of the present invention comprises a transfer chain 1 adapted to receive a decorated can 2 from an intermittently rotatable spindle turret 3 and to transfer the can to a conveyor 4 for conveying the decorated cans through a drying oven, not shown.

The mechanism for decorating the cans, whether it be coating or printing, forms no part of the present invention and can be of the type disclosed in the pending applications noted hereinabove; it being sufficient to point out that the cans to be decorated are sequentially placed on a respective spindle carried by the intermittently rotatable turret, whereby the cans are successively advanced to a decorating mechanism 5, FIGURE 1, to be selectively coated or printed.

As will be seen in FIGURES 2, 4, 5 and 6, the spindle turret 3, comprises a disc 6 secured to an intermittently rotatable shaft 7, it being understood that the shaft is operatively connected to a motor, which, through suitable transmission means, imparts the intermittent, rotary motion to the shaft. A plurality of spindles 8 are carried by the disc 6 in proximity to the periphery thereof, one end of each spindle being formed with a stub shaft 9 journaled within the disc, whereby the spindles are rotatable relative to the disc to facilitate decoration of a can carried thereon. Each of the spindles is provided with a longitudinal bore 10, FIGURE 6, which communicates with a chamber 11 formed in the stub shaft 9, an orifice 12 being provided in the end of the stub shaft for establishing communication between the chamber 11 and a bore 13 formed in the disc 6 of the spindle turret.

A piston assembly is slidably mounted in each spindle and comprises a piston rod 14 slidably mounted within the spindle bore 10, one end of the rod being provided with a flange 15 adapted to abut the end of the bore to limit movement of the piston (FIGURE 5) outwardly relative to the spindle, as will be described more fully hereinafter. The opposite end of the rod is provided with a piston 16 adapted to engage the conical neck portion 2a of the can 2 carried by the spindle. A groove 17 is formed in the piston rod and the flange 15, whereby to maintain constant communication between the bore 10 and chamber 11 of the spindle. Compressed air is adapted to be supplied to the bore 13 through a solenoid actuated valve 18 (FIGURE 2), the valve including an O-ring 19 to provide a seal between the end of the valve and the face of the disc 6 of the spindle.

In the operation of the assembly, thus far described, the spindle turret, carrying the decorated cans, is intermittently rotated in a counterclockwise direction so that each bore 13 is successively placed in communication with the valve assembly 18. Compressed air is then supplied to the chamber 11, forcing the piston assembly forward (FIGURE 5), piston 16 engaging the conical portion of the can, urges the can off the spindle. The flange 15 limits the outward movement of the piston assembly; however, compressed air continues to flow through the groove 17, the bore 10, and acts against the conical neck portion 2a of the can to force the open-ended neck portion 2b thereof onto a spindle 20 (FIGURE 6) carried by the chain transfer assembly 1. The diameter of the open-ended neck portion of the can is slightly greater than the diameter of the spindle 20 so that the can may slide freely onto the spindle while at the same time preventing a substantial amount of air from leaking through the open-ended neck portion of the can, whereby the air pressure forces the can off the turret spindle 8 and onto the chain transfer spindle 20.

After the decorated can is removed from the spindle turret 3, the disc 6 is rotated until the next succeeding spindle and associated can are aligned with the valve assembly 18 and the operation, as described above, is repeated. It will be understood by those skilled in the art that the movements of the turret spindle 3 and transfer chain assembly 1 are synchronized so that a chain spindle 20 is always aligned with a spindle 8 carried by the disc 6 at the position where a can is transferred from the turret spindle to the chain spindle.

In order for a decorated can to be transferred from the spindle turret to the chain assembly, it is necessary to momentarily stop the chain assembly at the position where the can is being placed thereon. The mechanism for momentarily stopping the transfer chain assembly is similar in construction to the mechanism disclosed in our aforementioned U.S. Patent 3,250,213 dated May 10, 1966, and comprises, a frame 21 (FIGURES 1 and 3) having a vertical extension 22, the frame and vertical extension being provided with a plurality of idler sprockets 23a, 23b, 23c, 23d, 23e, 23f and 23g. A driven sprocket 24 is positioned on one side of the frame 21 and is keyed or otherwise secured to a drive shaft 25 extending transversely to and journaled within the frame. A pulley 26 is positioned on the opposite side of the frame and is similarly secured to the drive shaft, the pulley being provided with a belt 27 for driving a rotatable shaft 28 journaled at one end in the frame 21 as at 29 (FIGURE 3), and at the opposite end in a support 30 secured to the frame. A cam disc 31 secured to the shaft 28 is provided with an eccentric annular groove 32 forming a trackway adapted to receive a roller 33, the roller being journaled on one end of a shaft 34 carried by a plate member 35, whereby rotational movement of the cam disc imparts reciprocatory movement to the plate member. An elongated slot 36 is formed in the frame to accommodate the reciprocatory movement of the shaft 34, and each end of the plate is provided with a roller 37 adapted to travel within a respective elongated slot 38 formed in the frame to thereby provide limit stops for the reciprocatory movement of the plate member. To complete the chain transfer assembly, a pair of idler sprockets 39a and 39b are rotatably mounted on the plate member 35, and an endless chain 40 having a plurality of transversely extending spindles 20 secured thereto, is wound on the idler sprockets 23a, 23b, 23c, 23d, 23e, 23f, 23g, 39a, 39b and on the drive sprocket 24.

In the operation of the chain transfer assembly, the drive sprocket 24 drives the chain 40 in the direction of the arrows as shown in FIGURE 1, rotation of the drive sprocket being accompanied by continuous rotation of the cam disc 31 to impart reciprocatory movement to the plate member 35 and the associated idler sprockets 39a and 39b, as described hereinabove. Thus, as the plate member 35 moves upwardly the amount of chain being fed around the drive sprocket 24 is being taken up by the upward movement of the idler sprockets 39a and 39b; therefore, the portion of the chain around sprockets 23d, 23e, 23f and 23g remains stationary. During this time interval, a decorated can is transferred from the spindle turrets onto a respective spindle on the chain 40, this transfer taking place at a position indicated at 41 in FIGURE 1. The plate 35 then moves downwardly, thereby decreasing the amount of chain between the drive sprocket 24 and the idler sprocket 39b, thus causing the portion of the chain wound on the idler sprockets 23d, 23e, 23f and 23g to advance in the direction of the arrows until the next spindle on the chain is in position to receive a can from the spindle turret, whereupon the chain is again stopped, as above-described. While the portion of the chain around sprockets 23d, 23e, 23f and 23g is intermittently stopped, the portion of the chain around sprockets 23a, 23b, and 23c moves continuously.

After the decorated cans have been placed on the transfer chain, they are then in position to be transferred to the conveyor 4 which carries the cans through a drying oven. As will be seen in FIGURES 1 and 3, the conveyor 4 is positioned adjacent the transfer chain 1, and comprises an endless chain 42, wound on a drive sprocket 43 (FIGURE 1) and idler sprocket 44 rotatably mounted in a frame member 45 (FIGURE 3), it being understood that additional idler sprockets are provided for supporting the conveyor chain in its travel through the drying oven. A plurality of pins 46 are secured to the conveyor chain and extend transversely therefrom in a direction toward the spindles 20 on the transfer chain. The linear speed of the oven conveyor 4 is substantially equal to that portion of the transfer chain which continuously moves so that each pin on the oven conveyor will be substantially in alignment with a corresponding spindle on the transfer chain, whereby the pin on the conveyor will be in position to receive a decorated can from the transfer chain.

The mechanism for transferring the decorated can from the transfer chain 1 to the oven conveyor 4 comprises a nozzle 47 secured to the frame 21, one end of the nozzle being connected to a source of compresesd air, and the opposite end being in proximity to a can 2 carried on a spindle 20 of the transfer chain. By this construction and arrangement, compressed air, issuing from the nozzle 47, impinges against the end of the can to thereby slide the can off the spindle and onto a pin 46 of the oven conveyor.

In the event that the force of the compressed air is insufficient to move the can off the spindle, a follow-up device is provided upstream from the nozzle for urging the can completely off the spindle. This device comprises, a bifurcated arm 48 (FIGURES 2 and 3) supported on the vertically extending frame member 22 by means of suitable rods 49. The opening or slot 48a defined by leg portions 48b and 48c of the arm 48 is designed to allow passage of the spindles 20 therethrough, as they travel upwardly in the direction of the arrow, as shown in FIGURE 3; the arm 48 diverging in a direction away from the vertically disposed transfer chain to thereby form a cam surface for progressively urging a can from a spindle 20 onto a respective pin 46 of the oven conveyor.

As will be seen in FIGURE 3, a resilient bumper 50, supported on the frame 45 by means of a bracket 51 is provided, whereby to form a cushion to prevent damage to the open end of the can when it is blown off the spindle. A vertically extending bar 52 is secured to the bracket 51, the vertical edge of the bar being adapted to be slidably engaged by the pins 46 as they move upwardly, to thereby preclude vibration of the chain and associated pins which would cause displacement of the cans carried thereon.

In the operation of the assembly, a can to be decorated is passed through the decorating station 5, FIGURE 1, by means of the turret spindle 3 which, in turn, transfers the decorated can to the transfer chain 1, as described hereinabove. The decorated can is then transferred from the transfer chain to the oven conveyor by means of either the compressed air supplied through nozzle 47, or by the camming action of the bifurcated arm 48, or by the combined action of these instrumentalities. As the cans, FIGURE 3, are placed on the pins 46 of the conveyor 4, they are carried through a drying oven, not shown, wherein the coating is dried, after which the cans are removed from the conveyor. In the event that it is desired to apply selected printing to the cans after they have been coated and dried, the cans are not removed from the conveyor as it emerges from the dyring oven, but instead, are permitted to return to the decorating machine, and are placed on the turret spindle 3, by means of suitable feed mechanism and feed wheels as described in U.S. Patent 3,227,070 dated Jan. 4, 1966, referred to hereinabove.

The machine of the present invention is designed for high speed coating or printing of aerosol cans. It will be appreciated that in order to decorate cans of this type at high speeds, 200 per minute and more, in an efficient and satisfactory manner, all of the main components and their auxiliary elements must be capable of performing their functions in synchronism, and also withstand the forces generated by such high speed operation. In accordance with the present invention, the components have been designed to provide a tube decorating machine characterized by convenient operation, dependability, and versatility. Among other features which contribute to the efficient operation of the machine is the improved transfer assembly for removing decorated cans from the spindle turret employed to advance the cans to the coating device or to the printing mechanism and position them on the chain transfer mechanism for subsequent transfer to the oven conveyor for conveying the decorated cans through a drying oven. The various components incorporate adjusting means, whereby to accommodate cans of different diameters and length, within the limits for which the machine of the present invention is designed; the machine is strong and sturdy in construction, and the components thereof, together with their associated auxiliary elements, are adjusted and synchronized to consistently and successfully handle a specified can size. Accordingly, under normal, prescribed conditions of use, no adjustment should be required even after long and continued use.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

We claim:
1. A spindle turret of the character described for use in high speed can decorating machines comprising, a rotatable shaft, a disc secured to one end of said shaft, a plurality of spindles secured to said disc, a transfer mechanism positioned adjacent to the spindle turret, piston means slidably mounted on each spindle, and compressed air means operatively connected to each spindle for sliding said piston means outwardly from the spindle for urging each can onto the transfer mechanism.

2. A spindle turret according to claim 1 wherein the piston means for urging each can from a respective spindle onto the transfer mechanism comprises, a longitudinal bore formed in each spindle, a piston rod slidably mounted in said bore, a piston connected to one end of said rod, one side of said piston being adapted to engage a portion of the can carried on the spindle, said compressed air means being operatively connected to the bore for supplying air to the opposite side of the piston, whereby the piston is adapted to be moved outwardly from the spindle to thereby urge the can therefrom.

3. A spindle turret according to claim 2, wherein a flange is secured to the opposite end of the piston rod, said flange being adapted to engage one end of the bore to limit the outward movement of the piston, passage means formed in the piston rod to allow the flow of compressed air through said bore, a conical neck portion formed on the end of the can, said one side of the piston engaging the conical neck portion of the can, whereby when compressed air is supplied to the bore, the piston moves outwardly a predetermined distance from the spindle to urge the can therefrom, the compressed air acting on the conical portion of the can to force it onto the transfer mechanism.

4. A transfer mechanism of the character described for use in high speed can decorating machines of the type employing a spindle turret, said transfer mechanism comprising a frame member, a plurality of sprockets rotatably mounted on said frame member, drive means for rotating at least one of said sprockets, an endless chain supported on said sprockets, a plurality of spindles secured to said chain and extending transversely therefrom, said spindles being adapted to receive a decorated can from the spindle turret, a conveyor positioned adjacent to the transfer mechanism and adapted to sequentially receive the decorated cans from the chain spindles for carrying the cans through a drying oven, and compressed air means operatively connected to the frame member and adapted to blow each can from the chain spindle onto the oven conveyor.

5. A transfer mechanism according to claim 4, wherein an arm is secured to the frame member upstream from the compressed air means, said arm being positioned adjacent to the chain spindles and extending in a divergent direction away from the frame member, whereby in the event that the pressure of the compressed air is insufficient to blow the can onto the conveyor, the divergent arm engages the can to urge it onto the conveyor.

6. A transfer mechanism according to claim 5, wherein the arm is provided with a bifurcation through which the chain spindles travel when transferring a can therefrom to the oven conveyor.

7. A transfer mechanism according to claim 4, wherein a resilient bumper is provided adjacent to the conveyor to cushion the impact of the can when blown from the chain spindles.

8. In a high speed can decorating machine of the character described, including an intermittently rotatable spindle turret adapted to advance cans to be decorated to a decorating station, and a transfer mechanism adapted to receive a decorated can from the spindle turret for transfer to an oven conveyor, the improvement consisting of providing each spindle on the turret with means for urging each can from the spindle onto the transfer mechanism, said means comprising, a longitudinal bore formed in each spindle, a piston rod slidably mounted in said bore, a piston connected to one end of said rod, one side of said piston being adapted to engage a portion of the can carried on the spindle, and compressed air means operatively connected to the bore for supplying air to the opposite side of the piston, whereby the piston is adapted to be moved outwardly from the spindle to thereby urge the can therefrom.

9. In a high speed can decorating machine of the character described, including an intermittently rotatable spindle turret adapted to advance cans to be decorated to a decorating station, and a transfer mechanism adapted to receive a decorated can from the spindle turret for transfer to an oven conveyor, said transfer mechanism comprising a frame member, a plurality of sprockets rotatably mounted on said frame member, drive means for rotating at least one of said sprockets, an endless chain supported on said sprockets, a plurality of spindles secured to said chain and extending transversely therefrom, and a stop-start mechanism operatively connected to the chain, whereby a portion of the chain is momentarily stopped at a predetermined station where the can is transferred thereto from the intermittently rotatable spindle turret, said oven conveyor comprising, a frame member, a plurality of sprockets rotatably mounted on said frame member, drive means for rotating at least one of said sprockets, an endless chain supported by said sprockets, a plurality of pins secured to said chain and extending transversely therefrom, and compressed air means operatively connected to the transfer mechanism frame member for blowing each can from the spindle of the transfer mechanism onto a respective pin on the oven conveyor.

References Cited by the Examiner

UNITED STATES PATENTS

| 1,839,438 | 1/1932 | Prussing | 198—20 X |
| 2,427,712 | 9/1947 | Casler | 198—25 |
| 3,115,091 | 12/1963 | Hakogi | 198—25 X |
| 3,203,533 | 8/1965 | Hauer | 198—76 |

FOREIGN PATENTS 679,786  2/1964  Canada.

EVON C. BLUNK, *Primary Examiner.*

EDWARD A. SROKA, *Examiner.*